United States Patent
Topolkaraev et al.

(12) 
(10) Patent No.: US 6,451,895 B1
(45) Date of Patent: Sep. 17, 2002

(54) ONE STEP PROCESS FOR MAKING BREATHABLE, CLAY FILLED POLYMER COMPOSITIONS HAVING CONTROLLED STABILITY IN CONTACT WITH AQUEOUS FLUIDS

(75) Inventors: Vasily A. Topolkaraev, Appleton; Thomas A. Eby, Greenville; James H. Wang, Appleton, all of WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/474,603

(22) Filed: Dec. 29, 1999

Related U.S. Application Data

(60) Provisional application No. 60/114,333, filed on Dec. 31, 1998, and provisional application No. 60/114,312, filed on Dec. 31, 1998.

(51) Int. Cl.[7] ............................................. A61K 9/00
(52) U.S. Cl. ................... 524/445; 501/141; 501/145; 501/148
(58) Field of Search ........................... 524/445, 378, 524/565; 424/489, 497, 501; 501/141, 145, 148; 523/521, 522, 513

(56) References Cited

U.S. PATENT DOCUMENTS

| | | |
|---|---|---|
| 3,759,729 A | 9/1973 | Fahn |
| 5,700,872 A | 12/1997 | Wang |
| 5,760,121 A | 6/1998 | Beall et al. |
| 6,117,438 A * | 9/2000 | Topolkaraev et al. ....... 424/404 |

FOREIGN PATENT DOCUMENTS

| | | |
|---|---|---|
| EP | 0278601 | 8/1988 |
| EP | 0322777 | 7/1989 |
| WO | WO-9907790 A * | 2/1999 |

OTHER PUBLICATIONS

Ogata et al. J. Appl. Polym. Sci 66: 573–581, 1997.*

Ogata, N. et al., "Poly(Vinyl Alcohol)–Clay and Poly(Ethylene Oxide)–Clay Blends Prepared Using Water as Solvent," J. Appl. Polym. Sci., vol. 66, No. 3, pp. 573–581 (1997).

Patent Abstracts of Japan, JP 61222536 (Mar. 10, 1986), Nippon Kayaku Co. Ltd.

Patent Abstracts of Japan, JP 60200822 (Nov. 10, 1985), Agency of Ind Science & Technology.

* cited by examiner

Primary Examiner—Edward J. Cain
Assistant Examiner—Kat W. Lee
(74) Attorney, Agent, or Firm—Kilpatrick Stockton LLP

(57) ABSTRACT

This invention discloses novel water-responsive compositions with improved stability to aqueous liquids and an improved method of making the compositions. The addition of organically modified clay to poly(ethylene oxide) significant improves the liquid stability and melt processability of the PEO. The PEO compositions can be produced using an economical one step process comprising blending a dry mixture of PEO and organically modified clay particles and melt processing the dry mixture. The melt processing of a mixture of PEO and organically modified clay particles facilitates the melt processing of PEO over a broad range of molecular weights, most notably high molecular weights. Advantageously, the process described herein eliminates expensive and complex processing steps and is useful for manufacturing flushable articles such as disposable diapers, feminine pads, pantiliners, etc.

30 Claims, 10 Drawing Sheets

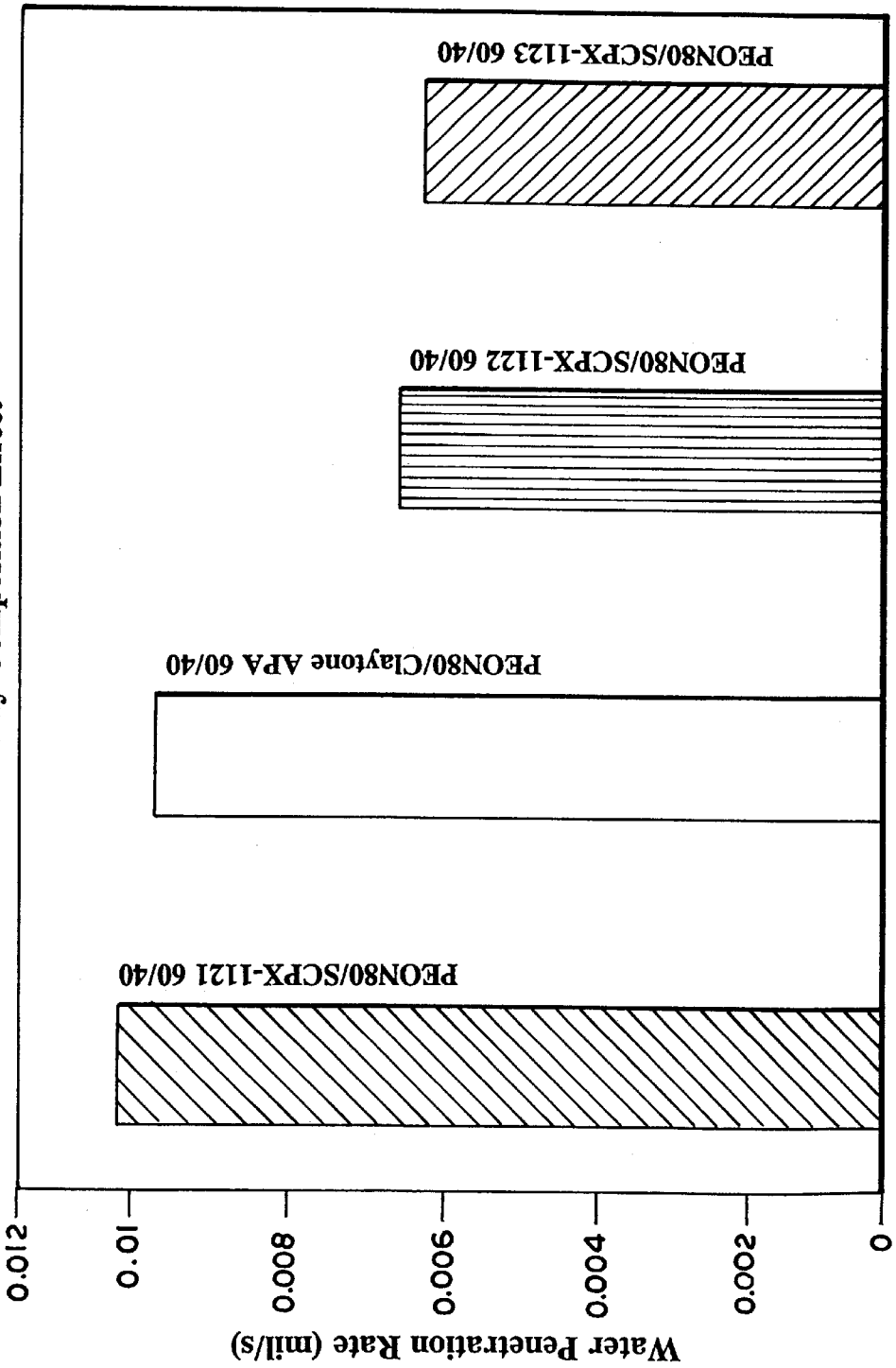

ONE STEP PROCESS FOR MAKING BREATHABLE, CLAY FILLED POLYMER COMPOSITIONS HAVING CONTROLLED STABILITY IN CONTACT WITH AQUEOUS FLUIDS

CROSS-REFERENCES TO RELATED APPLICATIONS

This application claims the benefit of U.S. Provisional Application Ser. No. 60/114,312, filed Dec. 31, 1998, and U.S. Provisional Application Ser. No. 60/114,333, filed Dec. 31, 1998.

FIELD OF THE INVENTION

The present invention relates to methods of making compositions comprising a water-responsive polymer and clay particles. Particularly, the present invention relates to methods of making compositions comprising melt blending organically modified clay or layered silicate particles and a water-responsive polymer that is optionally degradable, desirably environmentally degradable. In an exemplary embodiment, the water-responsive polymer is a polymer of ethylene oxide. In another embodiment, the water-responsive polymer is a graft copolymer of ethylene oxide.

BACKGROUND OF THE INVENTION

Disposable personal care products such as pantiliners, diapers, tampons, etc. are a great convenience. Disposable products provide the benefit of one time, sanitary use and are convenient, quick and easy to use. However, disposal of products is a concern. Incineration of products is not desirable because of increasing concerns about air quality and the costs and difficulty associated with separating incineratable products from non-incineratable articles. Dumping of products is also undesirable due to concerns with limited landfill space and increasing land cost. Consequently, there is a need for disposable products which may be quickly and conveniently disposed of without dumping or incineration.

It has been proposed to dispose of these products in municipal and private sewage systems. Ideally, these products would be both flushable and degradable, desirably biodegradable, in conventional sewage systems. Articles suited for disposal in sewage systems that can be flushed down conventional toilets are termed "flushable." Disposal by flushing provides the benefit of providing a simple, convenient and sanitary means of disposal.

Flushable products must have sufficient strength under the conditions in which they will be used. Thus, it is desirable for flushable personal care products to withstand the elevated temperature and humidity conditions encountered during use, yet lose integrity upon contact with water in the toilet. It is also desirable that these personal care products are breathable in order avoid the build-up of perspiration and increase the level of comfort of the consumers of these products. Therefore, a breathable material having mechanical integrity when dry and that readily disintegrates upon immersion in water is highly desirable.

Due to its unique interaction with water and body fluids, poly(ethylene oxide) (hereinafter PEO) is currently being considered as a component material for water-sensitive compositions. PEO,

is a commercially available, water-soluble polymer that can be produced from the ring opening polymerization of the ethylene oxide,

Because of its water-solubility and breathability, PEO is desirable for flushable and personal care applications. Although conventional PEO films are not as fluid stable as desired for many personal care applications and are difficult to process using conventional processing techniques, modified PEO compositions are being developed that are amenable to conventional melt processing. There is still a need to further improve the liquid stability of water-responsive an degradable polymer compositions.

Many have attempted to overcome these difficulties. U.S. Pat. No. 4,902,553 to Hwang et al. describes disposable articles comprising a liquid impermeable, vapor permeable film. The liquid impermeable, vapor permeable film described by Hwang et al. comprises a crystallizable, stretched polyolefin-based film and a rattle-reducing additive which may be poly(ethylene oxide). However, the liquid impermeable, vapor permeable films of U.S. Pat. No. 4,902,553 require at least one nucleating agent which may be talc or calcium carbonate and stretching to achieve breathability. The amounts of nucleating agent are limited to very small amounts, 0.05 to 5 percent by weight. These amounts of inorganic, nucleating agent are insufficient to be defined as fillers. Further, stretching is required to generate porosity and hence breathability and subsequent leaching of the rattle-reducing agent is desired. In contrast, the films of the present invention do not require stretching for breathability and do not necessarily require a nucleating agent or a crystallizable polyolefin. Normally, the addition of inorganic filler to a polymer without stretching to create voids does not enhance the breathability of the polymer. Conventional fillers such as mica, calcium carbonate and kaolin are not expandable. Many of these conventional fillers are plate-like in shape and provide barriers to the diffusion of air and vapors.

U.S. Pat. No. 3,895,155 describes coated, transparent plastic articles. The transparent plastic may comprise poly(ethylene oxide). An inorganic, protective coating is applied as a separate layer over the transparent plastic article to improve surface hardness, increase stretch resistance, and facilitate non-fogging. The inorganic, protective coating may comprise various metal oxides. However, the coating forms a separate, discrete, glass-like layer from the transparent plastic article and the resulting coating and articles are not breathable or flushable.

U.S. Pat. Nos. 5,075,153, 5,244,714, and 5,672,424 to Malhotra et al. describe multilayered or coated recording sheets designed for electrostatic printing processes. The recording sheets comprise a base sheet with an anti-static layer, which may be made from poly(ethylene oxide). The recording sheets comprise an additional toner-receiving layer, which comprises inorganic oxides such as silicon dioxide, titanium dioxide, calcium carbonate, or the like. The poly(ethylene oxide) and inorganic oxides are contained in separate layers, the anti-static layer and the toner-receiving layer respectively. The recording sheets are not breathable or flushable.

U.S. Pat. No. 4,276,339 to Stoveken describes a laminated product comprising a paper layer and a foamed layer.

Poly(ethylene oxide) is described as one of many possible components of an aqueous dispersion of latexes from which the foamed layer is made. Inorganic fillers such as clay or silica are suggested as possible additions to the aqueous dispersion of latexes in order to increase the solids content and density of the aqueous dispersion of latexes. The aqueous dispersion from which the foamed layer is made must be capable of being foamed and requires foaming in order to be breathable.

Currently available water-responsive, degradable and breathable compositions are not as stable when in contact with aqueous fluids as desired for many personal care applications. What is needed in the art is a means to improve the stability of water-responsive resins in contact with aqueous fluids. What is also need in the art is a method for making and controlling the fluid stability and degradability of water-responsive resins when in contact with aqueous fluids and for improving the processability of water-responsive, degradable and breathable compositions.

SUMMARY OF THE INVENTION

The present invention provides a method of producing compositions with controlled mechanical and/or structural stability when in contact with aqueous fluids. The compositions of the present invention comprise a blend of at least two components: (1) a polymer that is water-responsive and optionally degradable and (2) organically modified clay particles and/or organically modified layered silicate particles. Suitable water-responsive polymers include polymers and copolymers of ethylene oxide and other polar polymers whose properties degrade when exposed to water and aqueous solutions. Suggested water-responsive polymers include polar polymers with ester groups including degradable polyesters and polylactides. Desirably, the water-responsive polymer is environmentally degradable, particularly biologically degradable. Suitable organically modified clays include organically modified clays from the smectite group, such as montmorillonites and bentonites. Compositions, films, fibers and articles made by the method of the present invention have controlled degradability and enhanced stability when in contact with aqueous liquids, fluids and droplets. In addition, the compositions of the present invention provide enhanced mechanical stability when exposed to aqueous fluids, including liquids and vapors. These improvements make the compositions of the present invention more suitable for applications on flushable films, fibers and articles. An unexpected benefit of the addition of organically modified clay to PEO is improved melt processability of the PEO.

Surprisingly, the addition of organically modified clay or layered silicate particles to poly(ethylene oxide) improves the melt processability of the poly(ethylene oxide). Normally, unmodified poly(ethylene oxide) resins are not extrudable, especially at high and ultra high molecular weights, including up to 8,000,000 gram/mol viscosity average molecular weight. Dramatic improvements in the melt processability of poly(ethylene oxide) are observed with the addition of organically modified clay particles to poly (ethylene oxide) resins having average molecular weights of 1,000,000 grams per mole to 8,000,000 grams per mole.

Compositions, films and fibers made of the present invention are especially useful for manufacturing personal care articles with potential flushable and environmentally degradable or compostable applications, such as, diapers, feminine pads, pantiliners, training pants, and other articles incorporating flushable and environmentally degradable compositions and components. Other suggested uses for compositions, films and fibers of the present invention include the manufacture of health care articles, such as, bandages, gowns and wound dressings.

Key variables that effect the fluid stability of the compositions of the present invention include, but are not limited to: filler type, filler particle size and size distribution, filler expansion and swelling efficiency, filler interaction with the polymer and associated water, and molecular weight and selection of the water-responsive polymer component(s). In one embodiment of the present invention, the filler particles desirably have an average particle size which is not more than about 50 microns. More desirably, the filler particles have an average particle size that is not more than about 10 microns. Even more desirably, the filler particles have an average particle size that is not more than about 5 microns. Reduced particle sizes provide improved dispersion and processability.

BRIEF DESCRIPTION OF THE FIGURE

FIG. 9 is a bar graph illustrating the effect of the composition of the organically modified clay in the PEO/clay nanocomposite on water permeability.

DETAILED DESCRIPTION OF THE INVENTION

Figure 1A:
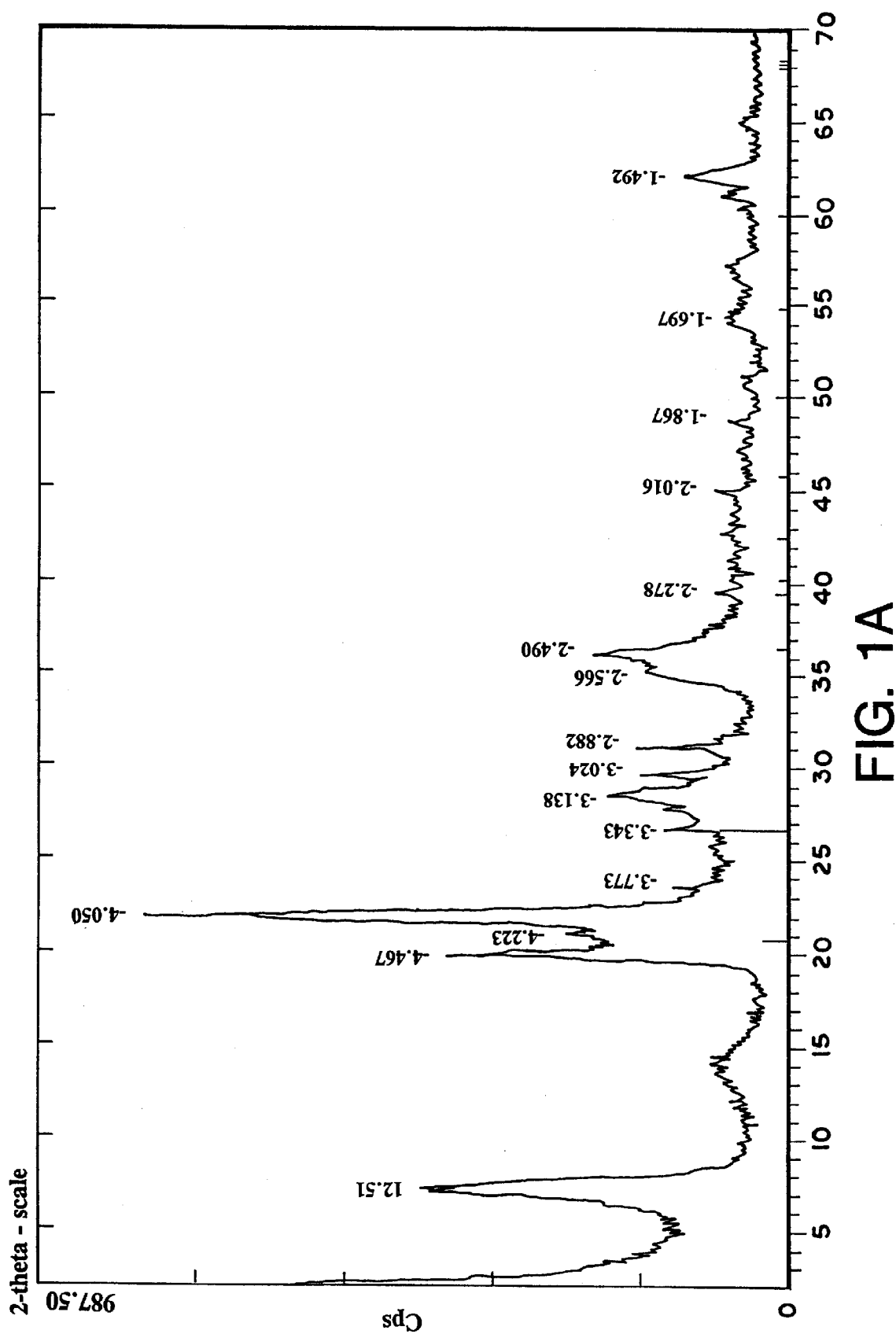
FIG. 1a is a x-ray diffraction pattern of unmodified clay.

Compositions of the present invention comprise at least two components: (1) a polymer that is water-responsive and (2) organically modified particles such as organically modified clays, layered silicates and mixtures thereof. In an exemplary embodiment, the water-responsive polymer is a polymer of ethylene oxide. The addition of organically modified clay particle and/or organically modified layered silicate particles to water-soluble ethylene oxide polymers provides controlled degradability and enhances the mechanical and structural stability of the polymers in contact with aqueous liquids. Significantly and unexpectedly, the addition of organically modified clay or layered silicate particles improves the melt processability of the ethylene oxide polymers, particular high and ultrahigh molecular weight ethylene oxide polymers, e.g. 1,000,000 to 8,000,000 g/mol average molecular weight. The compositions and methods described herein are useful for manufacturing both breathable and flushable and environmentally degradable articles such as disposable diapers, feminine pads, pantiliners, etc. Specifically, the compositions and methods described herein are useful for producing films, fibers and articles using standard extrusion procedures that have improved stability to aqueous liquids and that are flushable and optionally environmentally degradable. Additionally, the compositions and processes described herein may be utilized for nonflushable applications such as the manufacture of biodegradable materials and biodegradable films with controlled immobilization of fluids and materials with controlled interfacial behavior and surface properties.

The process of making films, fibers and other articles in accordance with the present invention includes the preparation of a nanocomposite having unique microstructure and is formed by melt blending, particularly extruding, a selected water-responsive polymer and organically modified clay particles or organically modified layered silicate particles or mixtures including such particles. The polymer component of the nanocomposite forms the matrix of the resulting composite. Although the present invention is demonstrated in the following examples by the use of poly(ethylene oxide), other known degradable polymers and other water-responsive polymers may be used as the water-responsive polymer component of the blend. Suggested water-responsive polymers include but are not limited to polymers of ethylene oxide, particularly homopolymers, modified polymers and graft copolymers of ethylene oxide; polymers of vinyl alcohol, polylactides and mixtures and blends thereof. Desirably, the water-responsive polymer is a water-responsive polymer or copolymer of ethylene oxide, more desirably, a homopolymer or graft copolymer of ethylene oxide. As used herein, the term "polymer" includes homopolymers, copolymers, terpolymers and modifications thereof.

The selection of the degradable polymer or the water-responsive polymer is based on consideration of key variables such as water solubility, biodegradability, controlled molecular weight, melt processability, strength and ductility. In the following examples, several commercially available poly(ethylene oxide) resins (hereinafter abbreviated as PEO) were selected as the polymer component of the blends of the present invention. However, the scope of the present invention is not limited to PEO and can be expanded to other polar or ionic polymers, other water-soluble or water-degradable polymers and other degradable polymers which can be intercalated with clay particles. Additionally, if PEO is selected as the base resin the PEO can be chemically modified by grafting, reactive extrusion, block polymerization or branching to improve its processability in a melt and performance in a solid state. PEO resins can be modified by reactive extrusion or grafting as described in more detail in copending application U.S. Ser. No. 09/002,197 which is herein incorporated by reference in its entirety. Optionally, the water-responsive polymer is water-dispersible or water-soluble. The water-responsive polymer, for example PEO, can be blended with other water-responsive polymers and with other environmentally degradable polymers.

As used herein, the term "water-dispersible" refers to the ability of a polymer, composition, film, article, etc. to dissolve or break into pieces smaller than 20 mesh after being immersed in water for approximately thirty minutes. The term "water-disintegratable" refers to the ability of a polymer, composition, film, article, etc. to break into multiple pieces within thirty minutes of immersion in water, wherein that some of the pieces are caught by a 20 mesh screen without slipping through in the same manner as a thread through the eye of a needle. The term "water-weakenable" refers to the ability of a polymer composition, film, article, etc. to remain in one piece, but weaken and lose rigidity after thirty minutes of immersion in water and to become drapeable, i.e. it bends without an external force applied thereto when it is held by one side at a horizontal position. The term "water-stable" refers to a polymer, composition, film, article, etc., which does not become drapeable after thirty minutes of immersion in water and remains in one piece after the water response test. Herein, the term "water-responsive" refers to compositions, films, articles, etc. that are water-soluble, water-dispersible, water-disintegratable or water-weakenable. "Environmentally degradable" as used herein relative to a composition or article means that the composition or article is degradable under the action of water, heat or naturally occurring microorganisms such that a significant change in the structure of the material, including a reduction in molecular weight or a change in chemical structure, or a significant loss of properties, such as mechanical integrity, mechanical strength, stiffness or elastic modulus, or fragmentation occurs.

The water-responsive polymers and the compositions of the present invention are desirably environmentally degradable. More desirably, the water-responsive polymers and compositions of the present invention are also melt-extrudable. Water-responsive polymers and compositions of the present invention may include water-responsive combinations, blends and mixtures incorporating such polymers. The degradable polymers and compositions of the present invention should desirably be melt-extrudable so that the polymer can be extruded and processed into films. The term "melt-extrudable" as applied herein to polymers and compositions means that the polymer or composition is a thermoplastic material having a melt flow rate (MFR) value of not less than about 0.2 grams/10 minutes, based on ASTM D1238. More particularly, the MFR value of suitable melt-extrudable polymers ranges from about 0.2 g/10 minutes to about 100 g/10 minutes. Desirably, the MFR value of suitable melt-extrudable polymers ranges from about 0.4 g/10 minutes to about 50 g/10 minutes, and desirably, ranges from about 0.8 g/10 minutes to about 20 g/10 minutes to provide desired levels of processability.

Desirably, the water-responsive polymer is permeable to water vapor when in the form of a film. Suitable water-responsive polymers are characterized by being soluble or dispersible in water or swellable in water, or by having tensile properties, such as tensile strength and tensile modulus, which drop substantially when the polymer, in the form of a film, is wetted with water. When dry, however, the water-responsive polymer holds shape and has integrity as a film. Desired water-responsive polymers include water-soluble and water-dispersible polymers which disintegrate in water. Desirably, the water-responsive polymers disintegrate in water in less than about five minute. Suitable water-responsive polymers include PEO, copolymers of ethylene oxide and polypropylene oxide, other water-responsive ethylene oxide copolymers, water-responsive blends of polyethylene oxide, water-responsive grades of polyvinyl alcohol, blends of polyvinyl alcohol, poly(vinyl pyrrolidone), polyethyloxazoline, water-responsive and water-degradable branched polyesters and copolyesters, water dispersible polyurethanes, water degradable acrylic acid based copolymers, water-dispersible polyvinyl methyl ether, cellulose derivatives such as methyl cellulose, hydroxypropyl cellulose, methylated hydroxypropyl cellulose, hydroxypropyl methyl cellulose and ethyl cellulose, and the like.

Suitable biologically degradable polymers are characterized by being degraded in the presence of naturally occurring microorganisms such that the films break down into smaller pieces or loses strength significantly, such that if the film is placed in a biologically-active environment, for example composting and sludge digestion, the film will be broken down. Biologically degradable polymers useful in the present invention include, but are not limited to, polycaprolactone, polybutylene succinate, poly(butylene succinate-adipate), poly(lactic acid), polyhydroxybutyrate-co-valerate, polyethylene adipate, polypropylene succinate, polylactic acid-poly(ethylene oxide) copolymers, and blends and mixtures thereof. The biologically degradable polymers can be blended or otherwise mixed with water-responsive polymers or water-soluble polymers to enhance the water-responsiveness of the overall composition. Specific examples of biodegradable resins useful in the present invention include, but are not limited to polycaprolactone TONE® P-787 resin from Union Carbide, and BIONOLLE® 1003, 3001 and 3003 resins from Showa Highpolymer, Japan.

The water-responsive polymer illustrated in the examples for making a water-responsive polymer film is PEO. Grafted or chemically modified PEO is also suitable. Suitable grafted or chemically modified PEO resins and their method of making are described in U.S. Ser. Nos. 09/001,408, 09/001,831 and 09/002,197, the disclosures of which are hereby incorporated in their entirety. Suggested modified and unmodified PEO resins useful as the water-responsive polymer component of the present invention desirably have molecular weights ranging from about 100,000 grams per mole to about 8,000,000 grams per mole (abbreviated hereinafter as g/mol). More desirably, the modified and unmodified PEO resins useful as the water-responsive component of the present invention should have molecular weights ranging from about 400,000 g/mol to about 4,000,000 g/mol. The higher molecular weight PEO resins in these ranges are desirable for enhanced liquid stability, increased mechanical strength and ductility. Whereas, the lower molecular weight PEO resins provide better flow and film forming properties. Taking these factors into consideration, a still more desirable range of molecular weights of PEO as the water-soluble polymer component is from about 200,000 g/mol to about 2,000,000 g/mol.

One commercial supplier of PEO resins is Union Carbide Chemicals & Plastic Company, Inc. Examples of suitable PEO resins available from Union Carbide include, but are not limited to, the resins sold under the following trade designations and reported average molecular weights: POLYOX® WSR N-80, a 200,000 g/mol PEO; POLYOX® WSR N-750, a 300,000 g/mol PEO; POLYOX® WSR N-3000, a 400,000 g/mol PEO; POLYOX® WSR 205 a 600,000 g/mol PEO; POLYOX® WSR N-12K a 1,000,000 g/mol PEO; POLYOX® WSR N-60K a 2,000,000 g/mol PEO; POLYOX® WSR N-301 a 4,000,000 g/mol PEO: and POLYOX® WSR N-308 a 8,000,000 g/mol PEO. (See also POLYOX®: Water Soluble Resins, Union Carbide Chemicals & Plastic Company, Inc., 1991, which is incorporated by reference herein in its entirety.) All of the PEO resins are supplied in powder form by Union Carbide. Both PEO powder and pellets of PEO may be utilized in the present invention.

The water-responsive polymer resins employed in and the compositions, films and articles of the present invention may optionally contain various additives such as plasticizers, processing aids, solid state modifiers, rheology modifiers, antioxidants, UV light stabilizers, pigments, colorants, slip additives, antiblock agents, polymer emulsions, etc. These additives may be added before, during or after blending the filler particles and the water-responsive resin. For instance, water repellant additives of various compositions such as fluorosilicones, organosilicones, other fluorochemicals, and specialty waxes, may be added to the compositions of the present invention to further enhance the liquid stability of the compositions. Desirably, the water-repellant additives can be added to the compositions of the present invention in amounts ranging from about 0.5 percent to about 10 percent by weight of the composition based on the sum of the weights of the water-responsive polymer and the particulate filler material. More desirably, the water-repellant additives can be added in the range of from about 1 percent to about 5 percent by weight of the composition. Commercial examples of suitable water-repellant additives include, but are not limited to, FX-1801 fluorochemical supplied by 3M and TLF-8860 fluorinated melt additive supplied by DuPont. Additionally, various surfactants can be added to water-responsive polymer resin before, during or after compounding with inorganic filler to control resin interaction with inorganic filler and to improve filler dispersion.

The present invention is demonstrated in the following Examples by the use of several of the above water-responsive grades of PEO. The examples utilize PEO resins with reported average molecular weights ranging from as low as about 200,000 grams/mol to as high as about 8,000,000 grams/mol. Normally, ultrahigh molecular weight grades of PEO, from about 1,000,000 to about 8,000,000 g/mol, do not readily extrude and degrade under conventional extrusion conditions. Surprisingly, the addition of clay filler particles to the PEO resins decreases the melt viscosities of the resins and thus facilitates the melt processing and extrusion of the resins. The surprising melt viscosity reduction and improvement in melt flow properties is particularly important in the melt processing of ultra high molecular weight PEO resins and facilitates melt processing and extrusion of high and ultra high molecular weight PEO resins. Films, fibers and other articles can be processed directly from PEO powders without the need of additional processing steps or aids. Advantageously, the melt viscosity reduction and improvement in melt flow properties brought about by the addition of organically modified clay filler allows high and ultra high molecular weight PEO resins to be pelletized. These same benefits have been observed with the grafting of PEO and are discussed in the above-referenced copending application describing grafted PEO. However, unlike the grafted PEO compositions, the clay filled PEO compositions of the present invention are not believed to have significantly altered molecular weights and molecular weight distributions.

The inorganic filler component(s) of the compositions of the present invention forms the disperse phase of the composite. Desirably, at least one of the fillers is an organically modified clay or an organically modified layered silicate. The selection of filler material is based on consideration of key parameters including, but not limited to, particle size, expansion and swelling efficiency, and interaction with the polymer. Clays from the smectite group, such as various forms of montmorillonites and bentonites, are desirable for the present invention. In one embodiment of the present invention, the clay or layered silicate filler desirably have an average particle size, which is not more than about 50 microns. More desirably, the average particle size is not more than about 10 microns, and even more desirably, the average particle size is not more than about 5 micron to provide improved dispersion and processability. Also, desirably the filler particles comprise bundles or stacks of extremely small platelets which are di-polar. "Di-polar" as used herein and applied to the platelets and means that the platelets possess different charges on the flat surfaces, desirably positive charges are on the other edges of the platelets and negative charges are on the flat surfaces of the platelets. The bundles and stacks of platelets desirably have high aspect ratios. The aspect ratio of a platelet is the ratio of the surface width of a particle to the thickness of the particle. The aspect ratio desirably is not less than about 3:1. More desirably, the aspect ratio is not less than about 5:1 and still more desirably not less than about 10:1. In other aspects of the present invention, the aspect ratio is not more than about 15,000:1, more desirably not more than about 5,000:1, and still more desirably not more than about 2,000:1.

Clays from the smectite group, such as montmorillonites and bentonites are suggested for the present invention. The sodium cation in the interlayer spaces of montmorillonites may be exchanged with organic cations to yield organically modified montmorillonite with expanded interlayer spacing and tailored interaction with a polymer resin. Such organically modified clays are more organophilic than unmodified clays. The organic cations may contain reactive groups thus providing inorganic/organic nanomers, i.e. nano-sized particles capable of reacting with the matrix polymer and having the potential for polymerization and/or grafting to the matrix polymer. Alternatively, the clay filler can be modified with intercalating organic polar polymers that do not have intercalating cations. Such polar polymers can be used individually to modify the clays or in combination with polar polymers containing intercalating cations. Organic polar polymers can be intercalated into interlayer spaces of a clay to produce an organically modified clay. Unmodified as well as organically modified, expanded smectites may also be incorporated in the compositions of the present invention. Organically modified clays provide much better dispersion in water-responsive polymers and greater structural and mechanical stability during exposure to aqueous liquids compared to unmodified clays as a result of tailored polymer-silicate interaction, larger basal spacing, and controlled hydrophobicity. Also, during melt processing organically modified clays can provide improved dispersion during melt processing of individual fine modified clay platelets and stacks and bundles of modified clay platelets in the water-responsive polymer matrix.

Other particulate fillers may also be incorporated in the compositions of the present invention. These other particulate fillers include, but are not limited to, calcium carbonate, mica, kaolin, talc, titanium dioxide etc., which may be subjected to surface treatment with various coatings and surfactants to impart an affinity to the polymer resin and render water repellent properties. However, such fillers may be significantly less efficient for controlling the sensitivity of a water-responsive polymer to aqueous liquids compared to organically modified clay fillers and less effective in improving melt processability.

Examples of commercially available clay materials utilizable in the present invention include, but are not limited to, one or more of the following: Polargel T clay, a highly efficient form of purified white bentonite commercially available from Kraft Chemical Company of Melrose Park, Ill.; Polargel NF clay, a highly purified bentonite, commercially available from Kraft Chemical Company of Melrose Park, Ill.; Suspengel Ultra clay, a high purity bentonite, commercially available from Cimber Performance Minerals of Cartersville, Ga.; and Bentolite H clay, a highly activated montmorillonite, commercially available from Southern Clay Products, Inc. of Gonzales, Tex. Examples of commercially available synthetic clays utilizable in the present include various grades of Laponite, a colloidal synthetic layered silicate available from Southern Clay Products, Inc.

Clay particles having a pretreated or organically modified surface typically absorb or interact with organic substances more readily and are desirable as the organically modified clay component of the compositions of the present invention. Clay particles having a pretreated or organically modified surface are generally referred to as organoclays. Organoclays exhibit increased compatibility with water-responsive polymers. Suggested organically modified or treated clays include, but are not limited to, one or more of the following: Organoclay Claytone APA, activator-free dimethyl benzyl (hydrogenated tallow) ammonium bentonite; Claytone HY, activator-free, quaternary ammonium compound-modified bentonite; Claytone 40, dimethyl-bis (hydrogenated tallow) ammonium bentonite; and organically modified clays SCPX-1121, SCPX-1122 and SCPX-1123 obtained from Southern Clay Products, Inc. of Gonzales, Tex.

Although organically modified clay particles and layered silicate particles have a stronger affinity to the water-responsive polymers and are required to enhance stability of the compositions of the present invention during exposure to aqueous fluids, additional conventional fillers may be added to the compositions of the present invention to modify and control the porosity. In addition to the organically modified clay and/or layered silicate component of the compositions, conventional fillers may be added to the compositions of the present invention in order to change the appearance, opacity or softness of the compositions and are also considered within the scope of the present invention. Conventional fillers include, but are not limited to, calcium carbonate and titanium dioxide. The calcium carbonate filler employed in the Examples is SUPERMITE® calcium carbonate filler, which is commercially available from ECC International of Sylacauga, Ala. The calcium carbonate filler particles may be surface-modified with a surface-modifying agent, such as a silicone glycol copolymer, to reduce the surface tension of the particles and improve their interaction with fluids. It is possible to modify the surface of the filler particles with a surface modifying agent having a Hydrophilic-Lipophilic Balance (abbreviated hereinafter as HLB) number ranging from 0 to about 15, desirably having a HLB number from about 6 to about 13. Liquid organosilicones suitable as surface modifying agents are commercially available from Dow Corning of Midland, Mich. The particulate filler material including the organically modified clay is suitably present in the compositions of the present invention in an amount of from about 1 percent to about 70 percent by weight relative to the sum of the weight of the water-responsive polymer and the particulate filler material. Desirably, the amount of filler material is from about 5 percent to about 60 percent by weight, and even more desirably, is from 10 percent to about 50 percent by weight of filler relative to the sum of the weight of the water-responsive polymer and the particulate filler material.

The polymer component employed in the compositions of the present invention may be suitably intermixed with the filler in powder or pellet form or otherwise combined using conventional mixing and blending techniques. Desirably, the water-responsive polymer component is mixed with the inorganic filler(s) prior to melting. The mixture is then melt blended in a suitable apparatus, such as a blender, a single-screw extruder, a twin-screw extruder, etc. In the following examples, the process for blending the water-responsive polymer and the inorganic filler is demonstrated on a lab scale, twin-screw extruder obtained from Haake of Paramus, N.J. However, other types of apparatus suitable for blending polymers and inorganic fillers may be utilized to produce compositions in accordance with the present invention. Films or sheets of the compositions may be fabricated by convenient techniques such as compression molding and/or extrusion casting.

The selection of process equipment for the preparation of the compositions and films of the following examples is based on major requirements such as high shear melt processing, sufficient residence time for mixing, and potential for high rate processing. Desirably, the component materials, the PEO resin and the inorganic particulate filler, are suitably intermixed prior to melting. However, the components of the compositions of the present invention may be fed separately in the melt processing apparatus. Conventional extruders having separate feeders are suitable for preparing the compositions of the present invention.

The process of preparing the compositions is demonstrated on a lab scale Haake twin-screw extruder described herein. The Haake twin-screw comprises a pair of custom-made, conical screws to provide high melt shear and increased residence time. A general description of the Haake twin-screw extruder is provided as follows. The Haake twin-screw extruder comprises six sections. Section 1 comprises a double flighted forward pumping section having a large screw lead pitch and a high helix angle. Section 2 comprises a double-flighted, forward pumping section having a screw pitch that is smaller than the screw pitch of Section 1. Section 3 comprises a double-flighted, forward pumping section having a screw pitch that is smaller than the screw pitch of Section 2. Section 4 comprises a double-flighted and notched, reversed pumping section having one complete flight with notches. Section 5 comprises a double flighted-notched forward pumping section having two complete flights. Section 6 comprises a double-flighted, forward-pumping section having a screw pitch intermediate the screw pitch of Section 1 and the screw pitch of Section 2. The Haake twin-screw extruder has three heated, extrusion zones with air cooling. The feeding section of the extruder is cooled by water to prevent premature melting of polymer resin. At the end of the extruder, a strand die with two holes each of 3 millimeters in diameter is fitted to the extruder to produce extruded strands of the composite. The extruded strands are cooled on a fan-cooled conveyor belt and then pelletized.

Dry mixtures of water-responsive polymer pellets or water-responsive polymer powders and filler are prepared with filler loading levels in a range from about 10 to about 50 percent by weight of filler to weight of polymer resin and filler material. Desirable, the filler loading level is less than about 80 percent by weight of filler to weight of polymer resin. The dry mixtures are flood fed into the twin-screw extruder operating at a rate in the range of about 45 to 55 revolutions per minute. For the examples comprising POLYOX® WSR N-80 PEO resin, the extruder temperatures are set at 120° C., 150° C., 150° C. and 150° C. for the first, second, and third heating zones and the die, respectively. For the examples comprising higher weight POLYOX® WSR N-12K and WSR N-308 PEO resin, the extruder temperatures are set at 170° C., 180° C., 180° C. and 180° C. for the first, second, and third heating zones and the die, respectively. After extruding, the filled PEO compositions are pelletized and fed through the extruder a second time. During the second extrusion, the extruder operates at a higher rate of about 75 to 95 revolutions per minute. The second extrusion produces uniform strands having smooth surfaces. The above-described processing design enables processing of PEO and clay composites under conditions of high shear and sufficient residence time using the short laboratory-scale extruder. Although, the compositions of the present invention are prepared by multiple extrusion, it is understood that a second extrusion is not necessary to produce the compositions of the present invention.

Flushable and breathable films may be fabricated from the PEO compositions using conventional film making techniques such as compression molding and extrusion casting without stretching, foaming or phase separation techniques. In the examples, the films are prepared from the previously extruded pellets of clay-filled PEO using the Haake laboratory scale extruder described herein. The Haake extruder has a shorter processing length and shorter processing and compounding time than desired. It is understood that films having enhanced liquid stability may be formed directly from organically modified clay filler particles and a water-responsive polymer using a larger extruder that is capable of blending the components and, optionally, casting a film from the blend of the components in one step. One such extruder is available from American Leistritz Extruder, Inc. of Somerville, N.J. Advantageously, flushable, breathable films may be melt processed directly from a dry mixture of the components in one processing step without pelletizing, stretching, foaming, phase separation techniques or other additional processing. Even more advantageously, high and ultrahigh molecular weigh water responsive resins, for example PEO with average molecular weights of up to about 8,000,000 grams per mol, can be processed in one processing step from a dry mixture comprising organically modified clay and the water-responsive resin. Addition of organically modified clay to high and ultrahigh molecular weight water-responsive resins can dramatically improve the melt flow characteristics, reduce the melt viscosity, and reduce the melt fracture of the water-responsive reins. The addition of modified clay to high and ultrahigh molecular weight PEO provides a method of producing strands and articles having smooth uniform surfaces directly from high and ultrahigh molecular weight PEO resins without the addition of plasticizers or other processing additives.

Figure 1B:
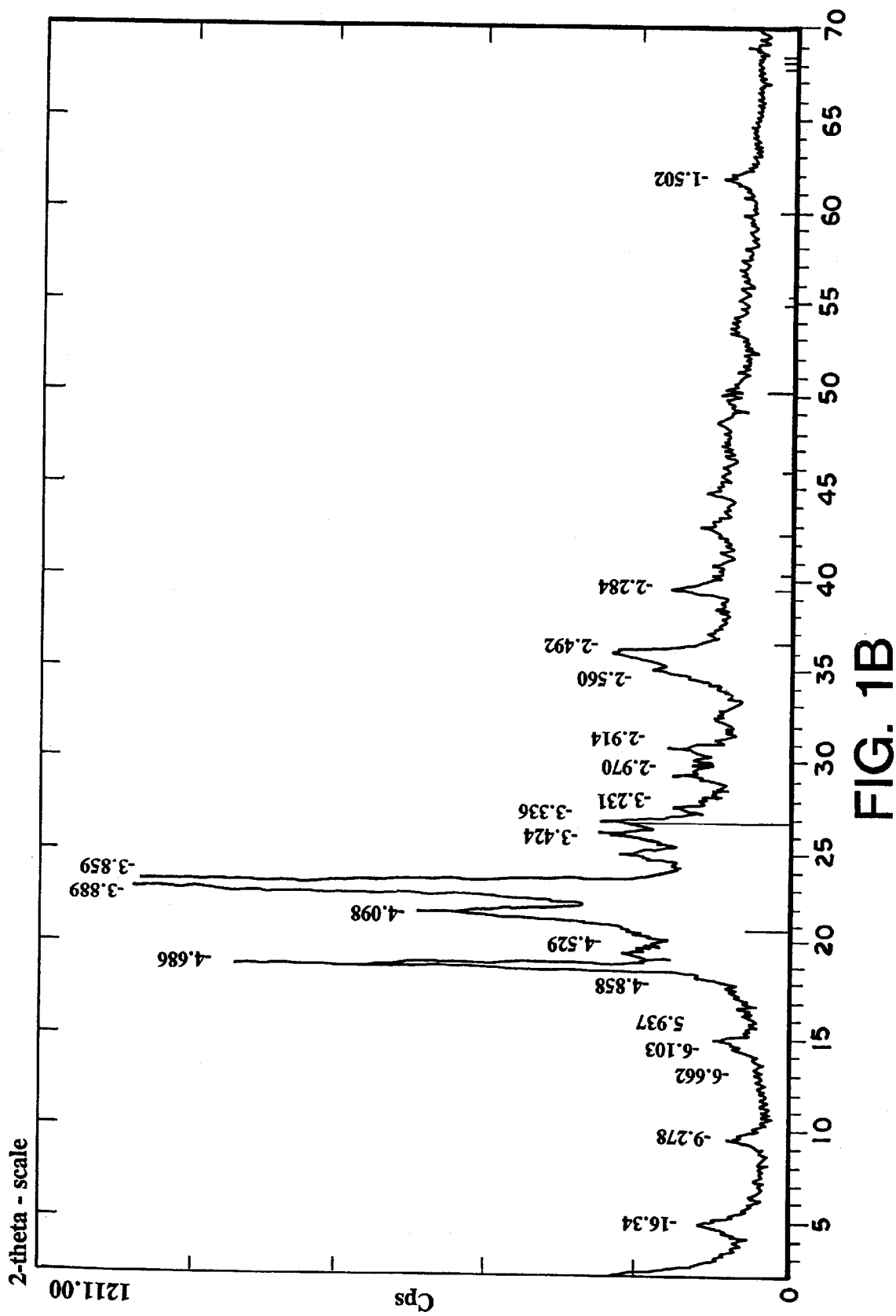
FIG. 1b is a x-ray diffraction pattern of a composite of unmodified clay and poly(ethylene oxide).
Figure 2:
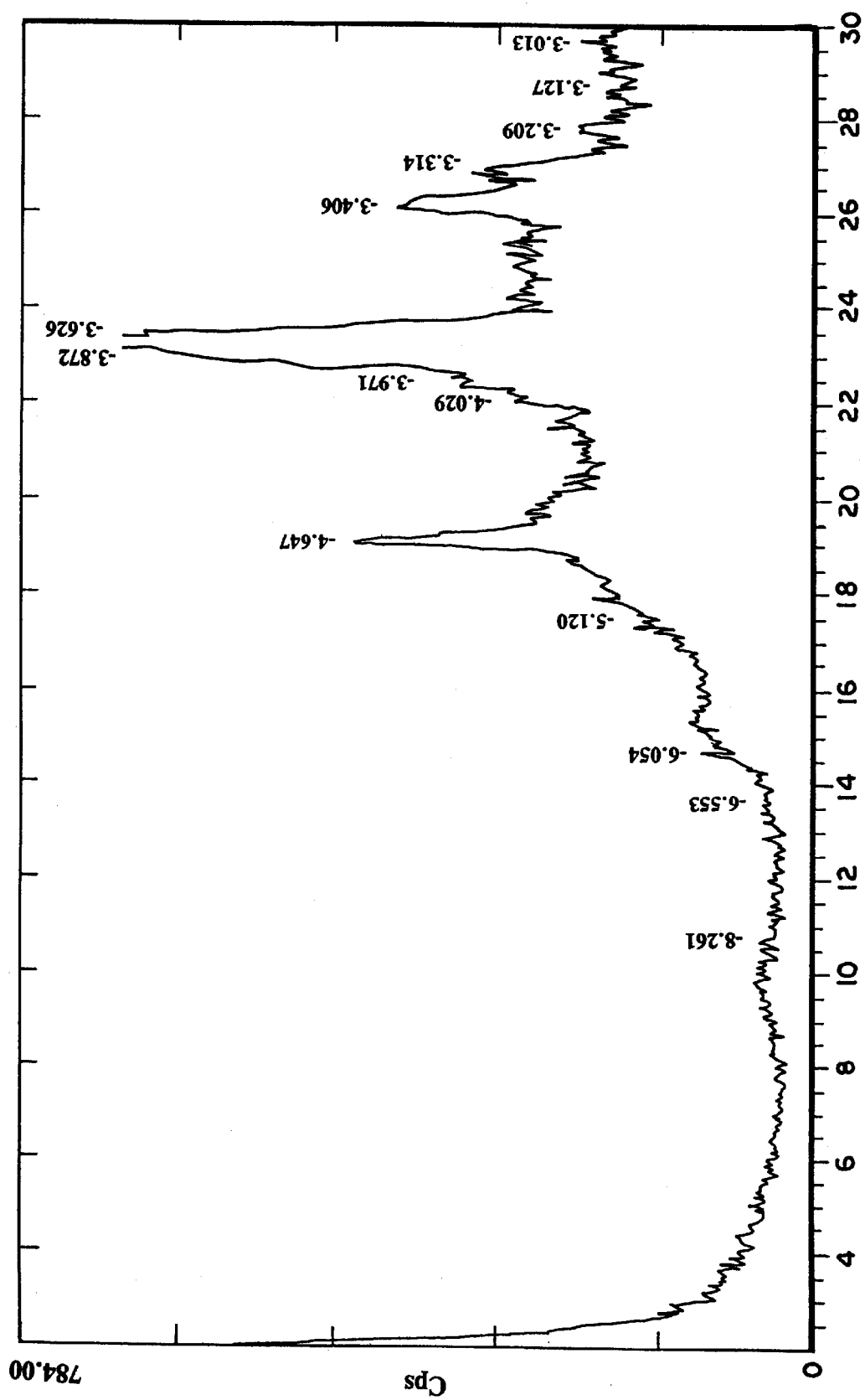
FIG. 2 is a x-ray diffraction pattern of a composite of organically modified clay and poly(ethylene oxide).

A unique structural arrangement has been discovered in the PEO and organically modified clay compositions of the present invention. X-ray, SEM, and TEM measurements reveal that clay platelets and stacks or bundles of clay platelets in the compositions of the present invention are dispersed in the PEO matrix. In contrast, X-ray measurement of an unmodified montmorillonite clay illustrated in FIG. 1a provide a repeat unit, d-spacing, of 12.51 angstroms and X-ray measurement of an unmodified clay and PEO composite shown in FIG. 1b provide a repeat unit, d-spacing, of 18.34 angstroms. The same X-ray measurement of an organically modified clay and PEO composite shown in FIG. 2 detect no basal clay reflections. The same X-ray measurement of an organically modified clay and PEO composite, shown in FIG. 2, detect no clay reflections in the small angle scattering region of 2 theta values below 8 degrees. This suggests that the clay platelets in a melt processed, e.g. extruded, composition of water-responsive polymer and organically modified clay are not assembled in a crystal form with distinctive repeat unit or d-spacing as compared to the PEO compositions containing only unmodified clays.

The X-ray measurements were made with a Siemens D5000 X-ray diffractometer equipped with a K-alpha radiation source. These observations indicate formation of a molecular composite in the organically modified clay and PEO compositions. These observations also indicate that the organically modified clay particles in the PEO and organically modified clay composite either expand to a d-spacing value higher than is detectable with the instrument configuration used or that amorphous dispersion of the clay platelets is achieved in a PEO and organically modified clay composite.

Figure 3:
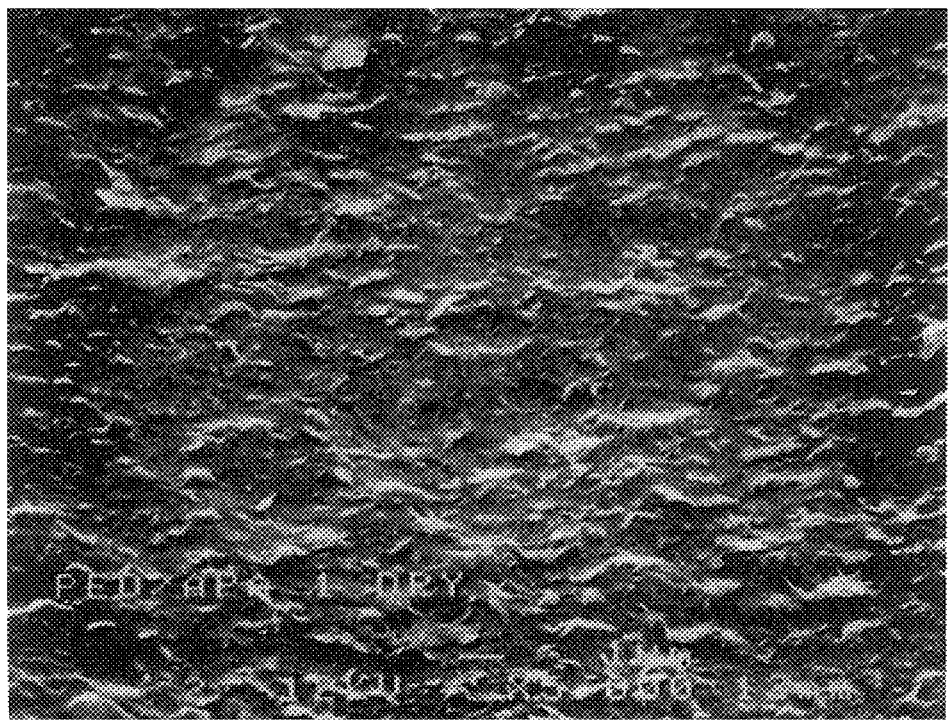
FIG. 3 is a SEM image of a cross-section of a film comprising a blend of PEO and organically modified clay particles.

FIG. 3 is a SEM micrograph of a composite of PEO and organically modified clay in accordance with the present invention. SEM measurement indicates that a wavy-form, nanodispersion of the clay platelets and stacks and bundles of clay platelets in the PEO and organically modified clay compositions of the present invention is achieved. The micrograph indicates a nanodispersion of fine bundles of clay platelets with a thickness about 10 nanometer and surface dimensions in the order of 0.5 to 2 microns is achieved in the composite shown in FIG. 3. Separation between wavy platelets is observed with a separation in the range of from several hundred angstroms to hundreds of nanometers. The unique amorphous nano scale dispersion of organically modified clay platelets and stacks and bundles of organically modified clay platelets in the PEO matrix, as demonstrated by X-ray and SEM analyses, is achieved as a result of a strong specific interaction between the modified clay platelets and the PEO molecules. It is believed that this strong specific interaction between the molecules of the water-responsive PEO resin and the organically modified clay particles provide for improved stability and controlled degradability of the water-responsive resin when in contact with aqueous liquids and fluids, including vapors. The enhanced structural and mechanical stability of PEO and organically modified clay composites in contact with aqueous fluids is also related to a reduced rate of penetration of the aqueous fluids into the structure comprising PEO and organically modified clay.

Figure 4:
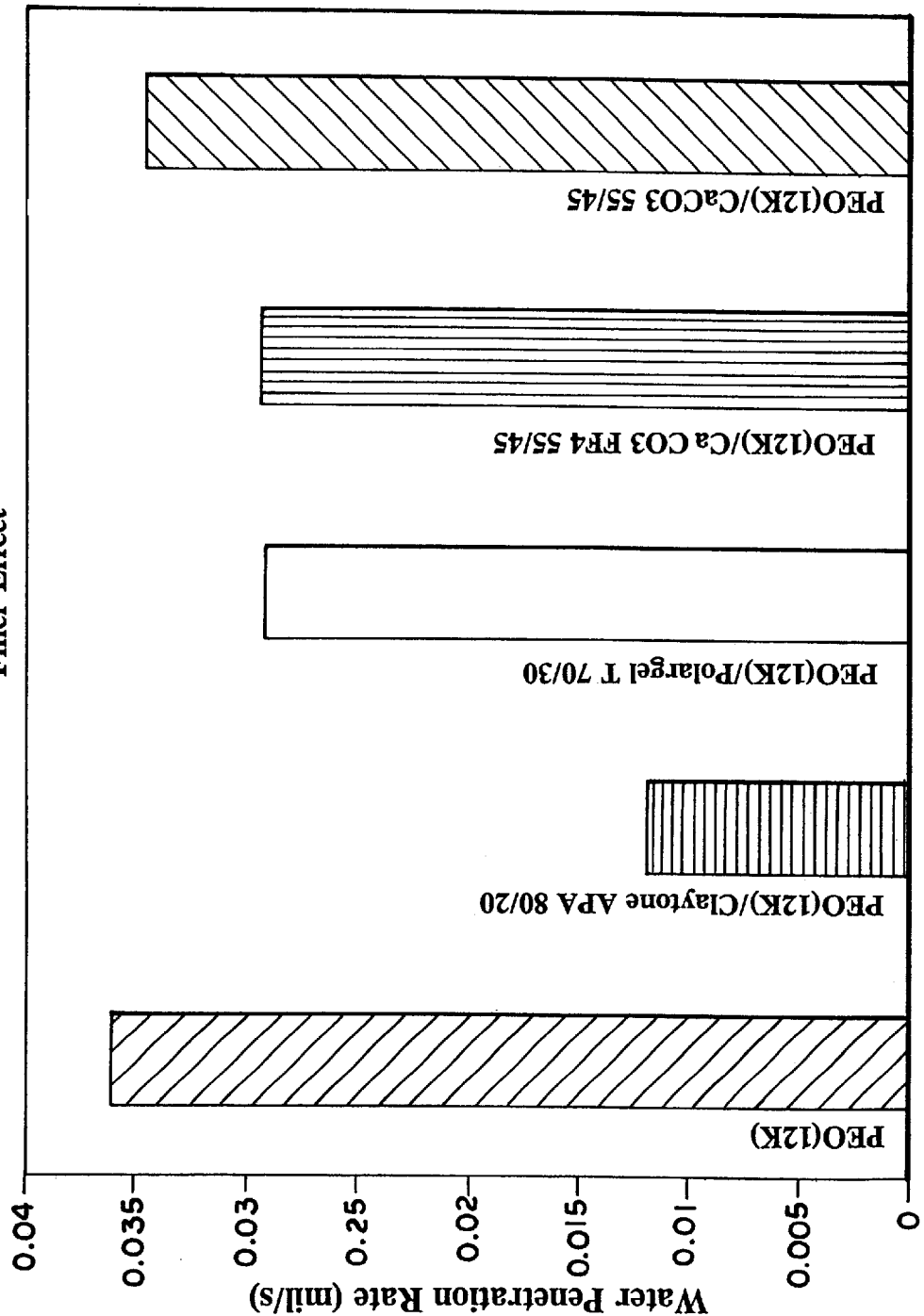
FIG. 4 is a bar graph illustrating the dramatic reduction in water permeability of PEO that can be achieved by the incorporation of organically modified clay in the PEO.
Figure 5:
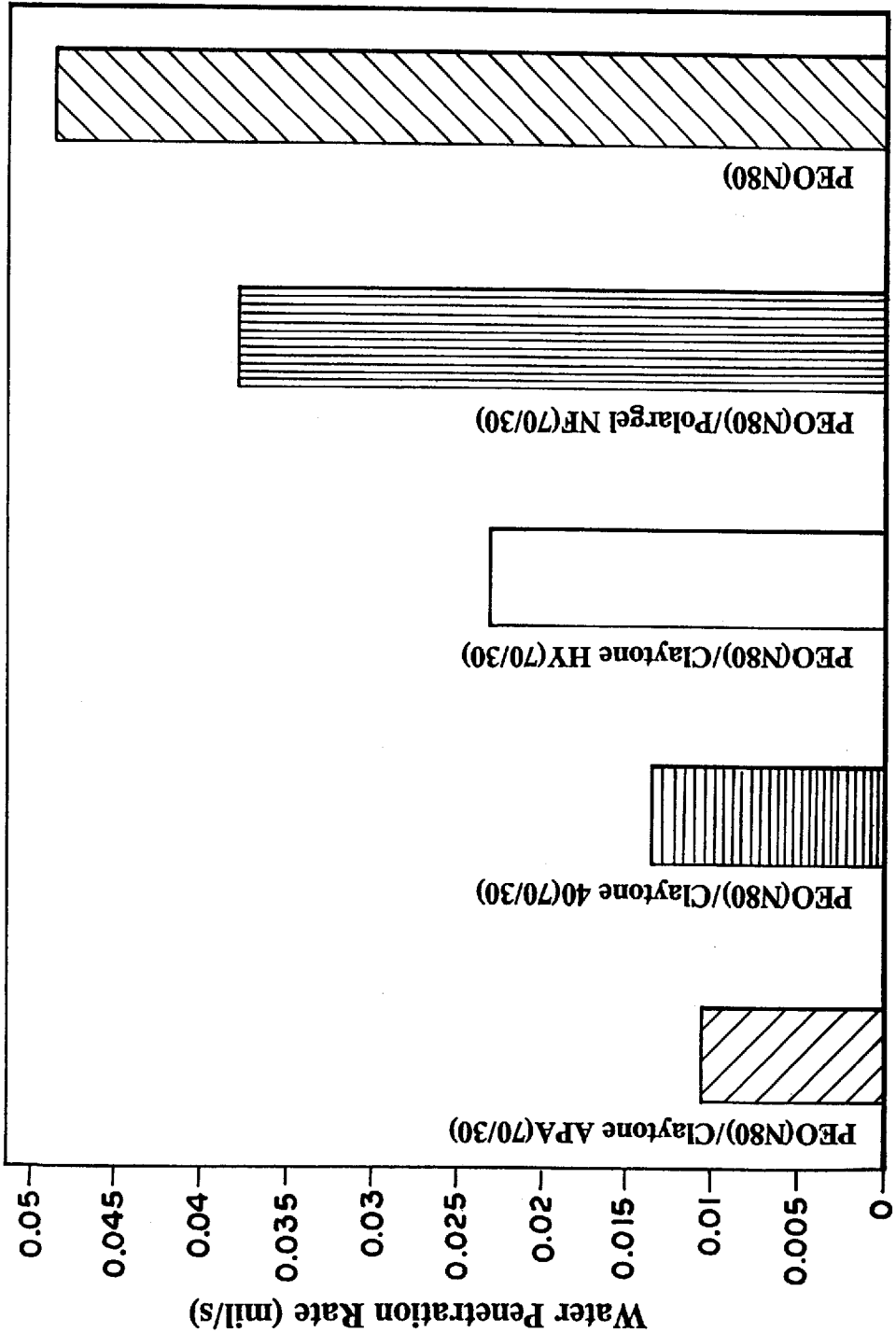
FIG. 5 is a bar graph illustrating the relative water permeabilties of three examples of organically modified clay and PEO compositions of a particular molecular weight versus the same molecular weight, unfilled PEO and a composite of the same molecular weight PEO and an unmodified clay.

The stability of the compositions of the present invention in contact with aqueous fluids and a rate of fluid penetration can be characterized as a rate of liquid drop penetration through films of the compositions of the present invention. The rate of fluid penetration measured as the rate of liquid drop penetration through a film was measured as follows. The rate of liquid penetration is estimated using drops of distilled water of 10 microliters and 20 microliters in volume. The average rates of liquid penetration rate through the films of the various PEO compositions of a given thickness are presented in FIGS. 4 and 5. FIGS. 4 and 5 demonstrate the reduction in water permeability of organically modified clay and PEO compositions (column 2 of FIG. 4 and columns 1,2 and 3 of FIG. 5). A dramatic reduction of penetration rate is observed for the PEO and organically modified clay hybrids of both low and high molecular weights compared to the unfilled PEO resins and conventional compositions of PEO and calcium carbonate. FIGS. 4 and 5 also illustrate the effect of the selection of filler type on water permeability. A composite of PEO and Claytone APA organoclay provided the lowest rate of water penetration, about 0.01 mil/sec compared to 0.05 mil/sec for the unfilled PEO shown in FIG. 5.

Water Penetration Rate Test and Method

To determine the resistance of compositions in accordance with the present invention to liquid water permeation, the water penetration rates of films of several PEO and organically modified clay compositions were measured using a Ring Barrier Test. The tests were conducted by preparing 3 inch by 3 inch square samples of film. Each film sample was placed over a layer of pH paper and sealed in a specimen holder. The pH paper indicates the presence of water by a change in color. The specimen holder comprises a metal ring with an inside diameter of 5.6 cm and a height of 2.5 cm. The holder, film and paper were clamped paper side down to a flat transparent base plate of about 15 cm by 15 cm with a metal crossbar and two wing nuts on a pair of studs. Next, 10 milliliters of distilled water were then poured into the ring and onto the film as rapid as possible. The time it took the water, or moisture, to penetrate through the film and discolor the pH paper below was measured. The rate for the water/moisture penetration of a film is calculated by dividing the film thickness by the time for penetration. A similar procedure was used to evaluate the rate of moisture or water penetration through the films of the present invention when small water drops of 10 microliters and 20 microliters were placed on the film surface

EXAMPLE 1

A film in accordance with the present invention was produced from 50 parts by weight of POLYOX® WSR 308 PEO resin and 50 parts by weight of Claytone APA organoclay filler. POLYOX® WSR 308 PEO resin has a reported average molecular weight of approximately 8,000,000 g/mol and was supplied in powder form.

The two components, the PEO powder and clay particles, were dry mixed and the resulting dry mixture was flood fed into a Haake twin screw extruder as described above. To form a blend from the mixture, the extruder was operated at a rate in the range of about 40 to 50 revolutions per minute and temperatures of 170° C., 180° C., 180° C., and 180° C. for the first, second, and third heating zones and the die, respectively. After extrusion, the PEO and clay blend was cooled. Surprisingly, the dry mix of the high molecular weight PEO powder and clay filler extruded easily and produced strands of the uniform blend without prior compounding or treatment. The strands produced by this first extrusion were observed to have very smooth surfaces, an indication of the improved melt processability provided by adding the clay filler to the PEO. Ordinarily, PEO of this molecular weight is not melt extrudable without prior treatment or modification, i.e. grafting of the PEO.

The strands were pelletized and molded into films of 13 mil in thickness using a Carver laboratory hot press set at 140° C. The film was tested for water penetration using the Ring Barrier Test method described above. The moisture penetration rate for the 13-mil film was about 0.008 mil per second. A localized film hydration was observed for this film, but the film did not fail during the water penetration test.

EXAMPLE 2

A film was produced from 50 parts by weight of POLYOX® WSR 301 PEO powder and 50 parts by weight of Claytone APA organoclay filler in the same manner as detailed in Example 1 above. Again, surprisingly, the dry mixture of the clay and the high molecular weight PEO extruded easily and produced uniform strands of clay filled PEO. The strands were visually observed to have very smooth surfaces, an indication of improved melt processability. The moisture penetration rate for a 13-mil film based on the 4,000,000 g/mol PEO was about 0.0083 mil per second. A localized film hydration was observed for this film, but the film did not fail during the water penetration test.

The POLYOX® WSR 301 PEO resin used in this Example has a reported average molecular weight of approximately 4,000,000 g/mol and was supplied and utilized in powder. All commercially higher molecular weight PEO resins cannot be pelletized and are supplied in powder form. In contrast, the improved melt processability observed in the compositions described herein allows the pelletization of higher weight PEO resins that are not normally pelletizable.

EXAMPLE 3

A film was produced from 50 parts by weight of POLYOX® WSR N-60K PEO powder and 50 parts by weight of Claytone APA organoclay filler in the same manner as detailed in Example 1 above. Again, the dry mixture of the clay and high molecular weight PEO extruded easily and produced uniform strands of the blend of PEO and clay. Additionally, the blended composite demonstrated high strength and ductility. The POLYOX® WSR N-60K PEO resin used in this example is provided and utilized as a powder and has a reported average molecular weight of approximately 2,000,000 g/mol. The moisture penetration rate for a 10-mil film based on the 2,000,000 g/mol PEO was about 0.0088 mil per second. A localized film hydration was observed for this film, but the film did not fail during the water penetration test.

EXAMPLE 4

A film was produced from 50 parts by weight of POLYOX® WSR N-12K PEO powder and 50 parts by weight of Claytone APA organoclay filler in the same manner as detailed in Example 1 above. Again, the dry mixture of the clay and the high molecular weight PEO extruded easily and produced uniform strands. The POLYOX® WSR N-12K PEO resin used in this Example is provided and utilized as a powder and has a reported average molecular weight of approximately 1,000,000 g/mol. The moisture penetration rate for a 10-mil film based on the 1,000,000 g/mol PEO of this Example was about 0.01 mil per second. A localized film hydration was observed for this film, but the film did not fail during the water penetration test.

COMPARATIVE EXAMPLE A

A film was produced from an unfilled POLYOX® WSR N-12K PEO powder in the same manner as Examples 1–4 above, but without the addition of organically modified clay particles. The extruder was operated at the same speed and temperatures. The unfilled high molecular weight PEO did not extrude easily and produced extremely non-uniform strands. The extruded strands exited the extruder with very rough surfaces indicating significant melt fracture during the extrusion processing. A 7-mil thick film was molded from the unfilled PEO resin in using the same hot press and same process as described above. The water penetration rate was tested using the apparatus and method as above. The moisture penetration rate for the 10 mil unfilled film was about 0.04 mil per second, four times higher than the moisture penetration rate of the clay filled PEO film based on the same molecular weight PEO. More importantly, dramatic film failure was observed in the formation of numerous macroscopic voids for this film during the water penetration test. Dramatic film failure was not observed for the films of the present invention, demonstrating the improved stability to liquid penetration of films from the compositions of the present invention. The improved stability is desirable for personal care applications and allows films and other articles made from the compositions to be handled by a consumer with wet hands prior to use or to otherwise exposed to small amounts of liquid without the films or articles failing.

EXAMPLE 5

Melt Rheology Measurement and Method

To further demonstrate the improved processability of compositions in accordance with the present invention, the melt rheologies of higher molecular weight PEO based organically modified clay compositions of Examples 1–4 were measured. Additionally, the melt rheologies of another unfilled PEO the 2,000,000 g/mol POLYOX® WSR N-60K PEO that was employed in Example 3, were measured (Comparative Example B). The melt rheologies were measured using a Goettfert Rheograph 2003 capillary rheometer and version 2.31 of WINRHEO analysis software. A 2000 bar pressure transducer was employed with a 30/1.0/180 round-hole capillary die. The melt viscosities in units of Pascal seconds were measured at 180° C. and shear rates of 50, 100, 200, 1000, and 2000 1/seconds. The measurements of the melt rheologies of the compositions of Examples 1–4 and Comparative Examples A and B are reported in Table 1 below.

TABLE 1

MELT RHEOLOGIES OF FILLED AND UNFILLED HIGH MOLECULAR WEIGHT PEO RESINS

| Tested Example No. | 50/sec (Pa sec) | 100/sec (Pa sec) | 200/sec (Pa sec) | 500/sec (Pa sec) | 1000/sec (Pa sec) | 2000/sec (Pa sec) |
|---|---|---|---|---|---|---|
| Example 1 | 4400 | 2640 | 1340 | 666 | 404 | 227 |
| Example 2 | 2650 | 1880 | 1090 | 687 | 414 | 237 |
| Example 3 | 2800 | 1540 | 993 | 531 | 322 | 202 |
| Example B | 5780 | 2890 | 1640 | 749 | 446 | 253 |
| Example 4 | 4230 | 2470 | 1380 | 632 | 360 | 198 |
| Example A | 6270 | 3130 | 1670 | 842 | 443 | 250 |

The observed data reported in Table 1 demonstrates the improved processability, particularly melt processability, of organically modified clay-filled PEO resins versus the same molecular weight unfilled PEO resins. Comparisons of Example 4 to Comparative Example A and Example 3 to the unfilled POLYOX® WSR N-60K PEO (Comparison Example B), clearly demonstrate that the addition of organically modified clay to PEO significantly reduces the viscosity of PEO over a broad range of shear rates.

Figure 6:
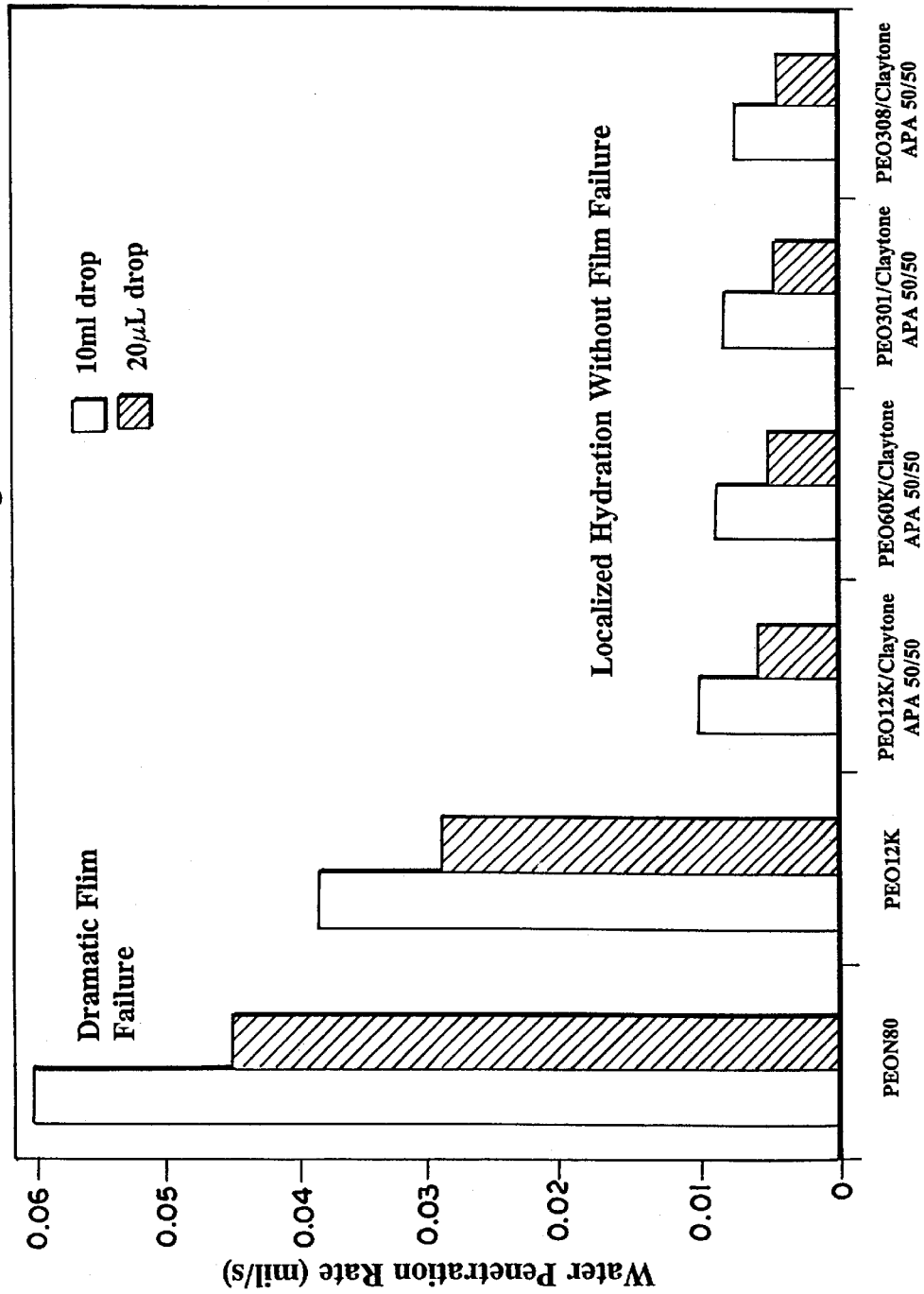
FIG. 6 is a bar graph illustrating the effect of the molecular weight of the PEO on water permeability.

Additionally, the stability of PEO hybrids to aqueous fluids was measured as a rate of fluid penetration through compression molded hybrid films of controlled thickness. The results are presented in FIGS. 6–9. A rate of penetration was measured for a controlled volume of liquid on the surface of the film with the volume of liquid corresponding to 10 microliter, 20 microliter and 10 milliliter. In the later case, the liquid covered 10 square centimeters of the film area with the head about 1 centimeter. Ultrahigh molecular weight PEO and organically modified clay hybrids demonstrate dramatic improvement in liquid stability compared to unfilled PEO resin of average molecular weight of 200,000 as illustrated in FIG. 6. Dramatic film failure, including the formation of macroscopic holes and voids, was observed for the unfilled PEO film when the film was in contact with water. In contrast, only localized hydration and no film failure or formation or holes or voids was observed in the case of the PEO and Claytone APA organoclay hybrids. This indicates that the mechanical and structural stability of films of the present invention when exposed to aqueous fluids, water, was dramatically increased.

Figure 7:
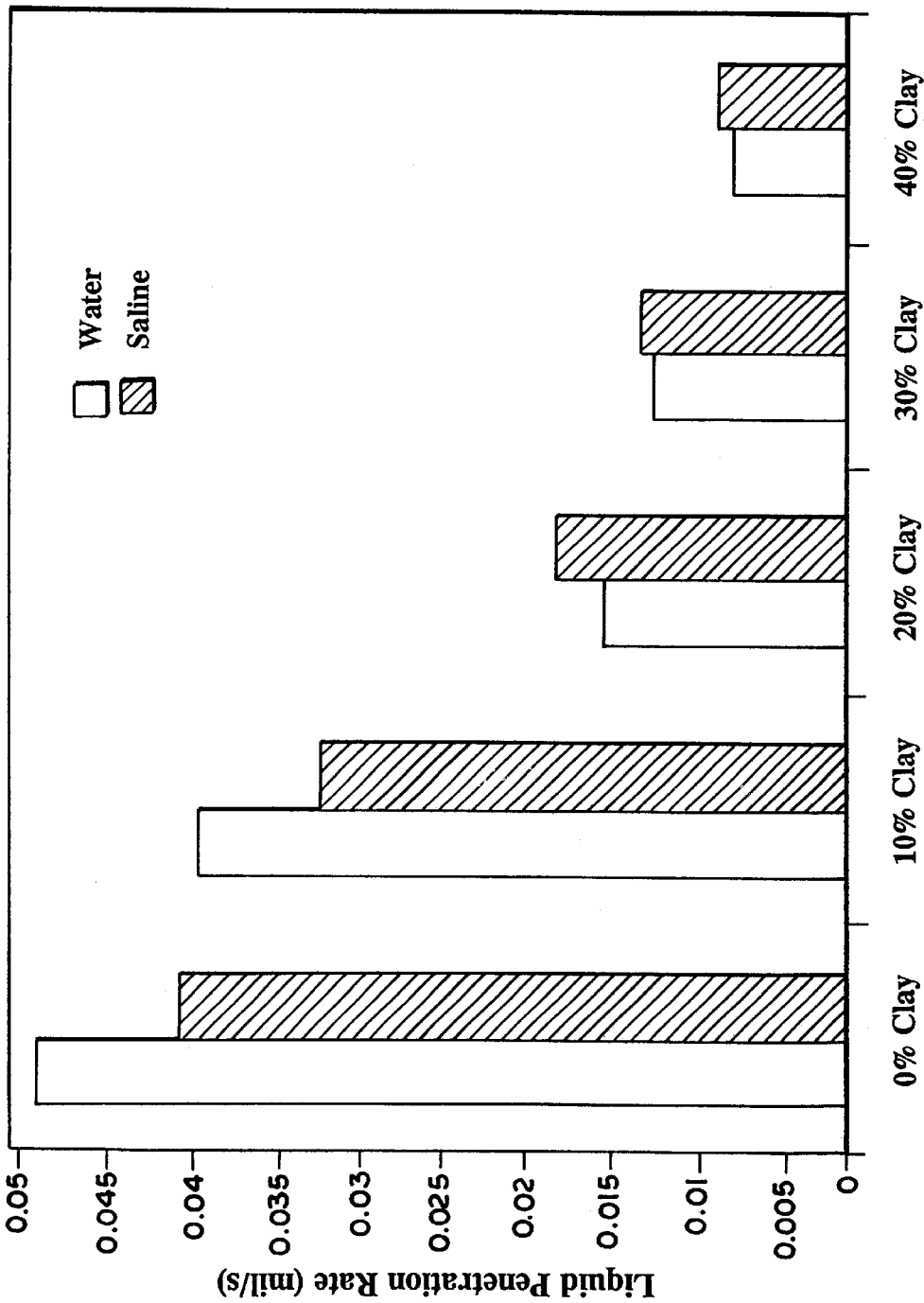
FIG. 7 is a bar graph illustrating the effect of the concentration of the organically modified clay in PEO/clay nanocomposites on water permeability.

The dramatically increased structural and mechanical stability of the water-responsive compositions of the present invention in contact with aqueous liquids, including fluids and fluid droplets, is related to reduced sensitivity and controlled degradability in water of the water-responsive resin of the compositions including organically modified clay. The increased structural and mechanical stability is also related to significantly reduced rates of moisture and/or water penetration into the composite structure. In the PEO films comprising organically modified clay particles, the water penetration rate was reduced by a factor of six and greater, compared to unfilled PEO N-80 resin (see FIG. 6). Referring to FIG. 6, some increase in water penetration rate for larger volumes of water did not change overall tendency for water penetration rate reduction. The level of liquid stability can be controlled by the organoclay loading as illustrated in FIG. 7. Significant improvement in liquid stability of films in both water and saline was observed for PEO N-80/Claytone APA organoclay hybrids with the increase of organically modified clay content. With 40 percent of Claytone APA organoclay, the liquid penetration rate can be reduced by a factor of five.

Figure 8:
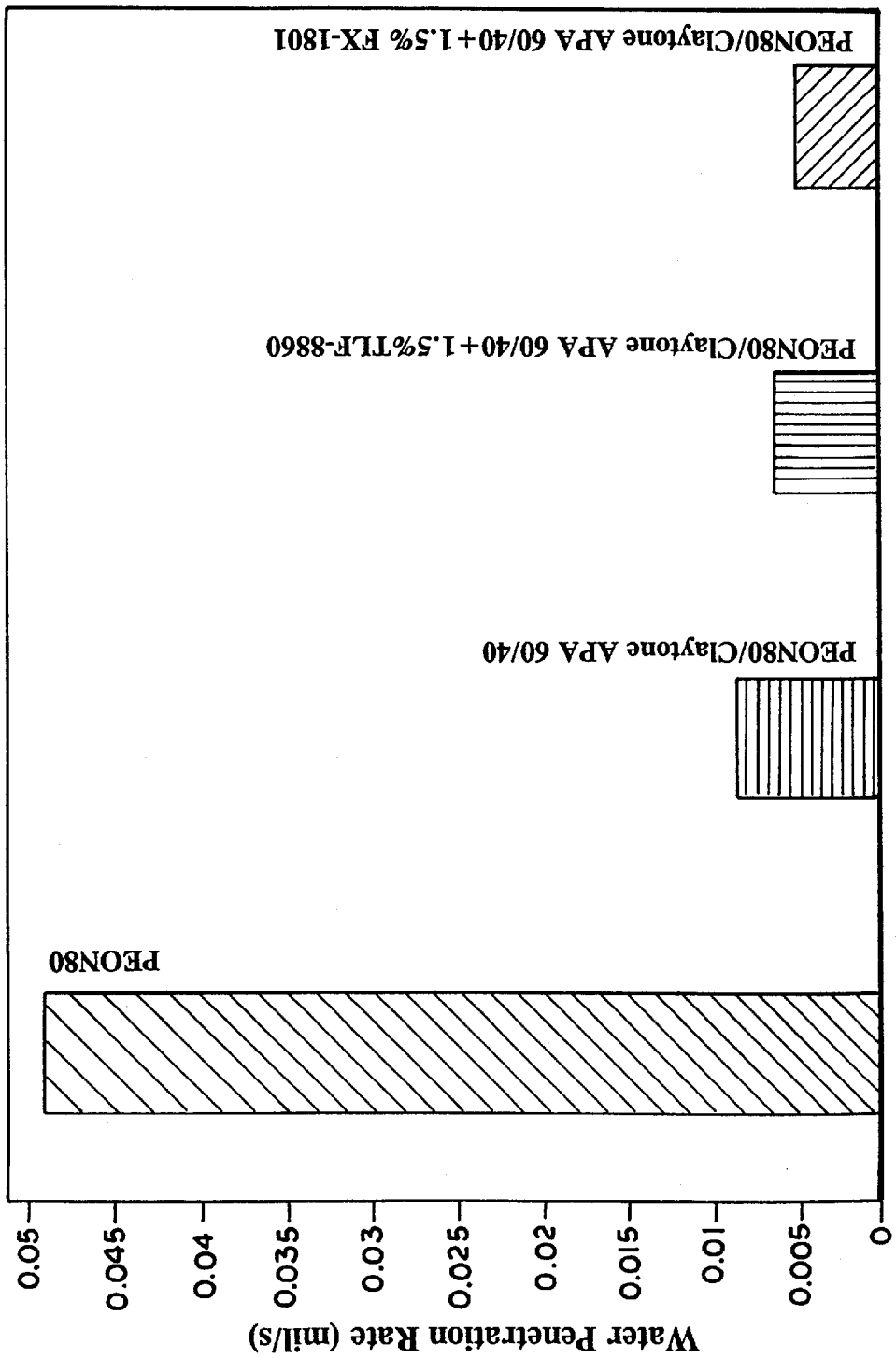
FIG. 8 is a bar graph illustrating the effect of the optional addition of water-repellant additives to a PEO/clay nanocomposite on water permeability.

Additional improvements in structural and mechanical stability during exposure to aqueous liquids can be achieved by modifying the PEO/Organoclay compositions with the use of water repellent additives. In FIG. 8, the effect of the fluorochemical additives on a liquid stability of the PEO/Claytone APA (60/40) hybrid film is illustrated. The addition of 1.5 percent of FX-1801 fluorochemical water repellent additive reduces the liquid penetration rate by a factor of ten compared to unfilled PEO N-80 resin. Even better results are expected for the ultrahigh molecular weight PEO and organoclay hybrids. The degradability and sensitivity of the PEO and organoclay hybrids to aqueous fluids can also be controlled by the composition of the organoclay. In FIG. 9, the effect of organoclay composition on water penetration rate is illustrated. The trend in hydrophilicity of the organoclays used in this Figure and the accompanying experiment is as follows: SCPX-1123 organoclay is more hydrophobic than SCPX-1122 organoclay which is more hydrophobic than SCPX-1121 organoclay. The organoclay SCPX-1123 is the most hydrophobic and has the greatest effect on water permeability. More hydrophobic clays provide lower water penetration rates, which can be related to the improved interaction of a modified, more hydrophobic clay with PEO and reduced affinity of modified clay to water. Preliminary data indicates a significant improvement in a structural and mechanical stability of the threads and filaments of PEO/organoclay compositions when exposed to aqueous fluids and liquid compared to the threads of a plain PEO resin.

According to certain aspects of the present invention, breathable films can be formed without stretching or foaming. The breathability of the films can be characterized by the water vapor transmission rate (WVTR). The larger the WVTR of a material, the higher the breathability of the material. WVTRs of greater than 500 g/m$^2$/24 hr per 1 mil of film thickness are considered as breathable for the purposes of the present invention. In particular aspects of the present invention, the WVTR is at least about or more than 500 g/m$^2$/24 hr/mil (grams per square meter per 24 hours per 0.001 inch of film thickness). Desirably, the WVTR is at least about or more than 2000 g/m$^2$/24 hr/mil.

Water Vapor Transmission Test and Method

To determine the breathability of compositions of the present invention, the water vapor transmission rates of films of PEO and clay composites were measured in accordance with ASTM Standard E96-80. Circular samples measuring 3 inches in diameter were cut from each of the tested materials as well as a control standard material, CELGARD® 2500 microporous film available from Hoechst Celanese Corporation. Individual samples of the test materials and the control material were placed across the open tops of the individual vapometer cups, each vapometer cup containing one hundred milliliters of distilled water. The screw-on flanges of the vapometer cups were tightened to form a seal along the edges of the cup. The sealed cups were placed in a convection type oven set at 100° F. The relative humidity within the oven was not specifically controlled.

The cups were first weighed (weight before) and then immediately placed into the oven. After 24 hours, the cups were removed from the oven and weighed again (weight after). The base WVTR of each material was calculated based on the weight loss ($\Delta W$) and is reported in g/m$^2$/24 hr. The base rate was normalized to the water vapor transmission rate of the control standard, CELGARD® 2500, by multiplying the base rate by a correction factor (CF):

$$WVTR = \text{Base rate} \times CF$$

The correction factor CF was calculated by assuming the WVTR of the CELGARD® 2500 microporous film to be 5000 g/m$^2$/24 hr under predetermined set conditions:

$$CF = 5000/\text{CELGARD® 2500 base rate}.$$

The WVTR adjusted to the film thickness was calculated by multiplying the WVTR by the film thickness in mils (adjusted WVTR) and is reported in g/m$^2$/24 hr/1 mil.

The method and resulting measurements were normalized against a 1 mil film of CELGARD® 2500 as a control standard. The data was adjusted to the film thickness of 1 mil, assuming an inverse proportionality of WVTR rate to the film thickness. Films comprising a blend of 70 weight percent POLYOX® N-80 PEO resin and 30 weight percent Claytone APA organically modified clay ranging in thicknesses of from about 2.2 to about 2.7 mil were measured to have a mean adjusted WVTR of 3330 g/m$^2$/24 hr/mil.

The dry tensile properties of PEO resins can also be improved by the addition of organoclays to the PEO resins. Increases in tensile modulus and tensile strength have been demonstrated. Specifically, higher molecular weight PEO resins can be more readily processed with the addition of organoclay filler to fabricate articles with improved strength and ductility compared to unfilled PEO resins. In summary, the methods of the present invention can be used to produce polymer compositions with a unique morphology and performance and can also be used to enhance the stability of water-responsive polymers to high humid environments, reduce the penetration rates of liquids in water-responsive polymers, improve the thermal stability of polymers, increase strength including tensile modulus and bending modulus of polymers and can further be used to modify the hydrophobic or hydrophilic properties of the various polymers described herein. The present invention enables the development of compositions of high and ultrahigh molecular weight PEO with organically modified clay that can advantageously be used to produce stronger, more ductile and more liquid stable compositions than low molecular weight PEO and clay compositions.

It is to be understood that the above examples are illustrative embodiments and that the present invention is not to be limited by any of the examples or details in the description. Rather, the claims appended hereto are to be construed broadly within the scope and spirit of the present invention. Particularly, it is to be understood that the present invention includes films, multilayer films and articles in which the claimed composition is employed.

We claim:

1. A process of making a composition comprising:
   a) combining a water-responsive polymer and greater than 5 weight percent of particles of an organically modified clay relative to the sum of the weight of the polymer and the organically modified clay, wherein the organically modified clay is selected from the group consisting of organically modified clays and organically modified layered silicates; and
   b) melt processing the dry mixture of the water-responsive polymer and the organically modified clay particles under sufficient shear and melt conditions to produce a melt extrudable composite with a nano scale dispersion of the clay particles.

2. The process of claim 1, wherein the polymer is melted before being combined with the particles of the organically modified clay.

3. The process of claim 1, wherein of the polymer and the particles of an organically modified clay are fed simultaneously into a melt processing apparatus.

4. The process of claim 1, wherein the polymer is selected from the group consisting of polymers of ethylene oxide, and degradable polyesters and mixtures thereof.

5. The process of claim 2, wherein the water-responsive polymer is a graft copolymer of ethylene oxide.

6. The process of claim 1, wherein the water-responsive polymer is a graft copolymer of poly(ethylene oxide) and at least one polar, vinyl monomer.

7. The process of claim 6, wherein the graft copolymer of poly(ethylene oxide) and at least one polar, vinyl monomer is formed by the graft polymerization of from about 0.1 to about 20 weight percent of polar, vinyl monomer or a mixture of polar, vinyl monomers relative to the total weight of poly(ethylene oxide) and the polar, vinyl monomer or mixture of polar, vinyl monomers with the poly(ethylene oxide).

8. The process of claim 7, wherein the polar, vinyl monomer is selected from the group consisting of 2-hydroxyethyl methacrylate, poly(ethylene glycol) methacrylates and poly(ethylene glycol)ethyl ether methacrylates.

9. The process of claim 2, wherein the polymer of ethylene oxide has a molecular weight within the range from about 100,000 grams per mol to about 8,000,000 grams per mol.

10. The process of claim 9, wherein the polymer of ethylene oxide has a molecular weight within the range from about 200,000 grams per mol to about 4,000,000 grams per mol.

11. The process of claim 1, wherein composition comprises greater that 10 weight percent of organically modified clay particles relative to the sum of the weight of the water-responsive polymer and the organically modified clay particles.

12. The process of claim 4, wherein composition comprises greater that 20 weight percent of organically modified clay particles relative to the sum of the weight of the water-responsive polymer and the organically modified clay particles.

13. The process of claim 11, wherein the organically modified clay filler particles comprise organically modified smectite clay particles.

14. The process of claim 11, the organically modified clay filler particles comprise organically modified montmorillonite clay or organically modified bentonite clay particles.

15. The process of claim 14, wherein the organically modified clay filler particles comprise organically modified sodium bentonite particles.

16. A film made by the process of claim 1.

17. The film of claim 16, wherein the film is flushable.

18. A multilayer film comprising a layer made by the process of claim 1.

19. An article made by the process of claim 1.

20. A process of making a film comprising melt blending a water-responsive polymer of ethylene oxide having an average molecular weight within the range of from about 100,000 grams per mol to about 8,000,000 grams per mol and greater than 10 weight percent of organically modified clay filler particles, organically modified layered silicate particles or a mixture thereof relative to the sum of the weight of the water-responsive polymer of ethylene oxide, the organically modified clay particles and the organically modified layered silicate particles.

21. The process of claim 20, wherein the water-responsive polymer of ethylene oxide has an average molecular weight within the range of from about 200,000 grams per mol to about 4,000,000 grams per mol.

22. The process of claim 21, wherein the water-responsive polymer of ethylene oxide has an average molecular weight within the range of from about 200,000 grams per mol to about 1,000,000 grams per mol.

23. The process of claim 21, wherein the melt blend comprises greater than 20 weight percent organically modified bentonite clay particles relative to the sum of the weight of the water-responsive polymer of ethylene oxide, the organically modified clay particles and the organically modified layered silicate particles.

24. The process of claim 20, wherein the organically modified clay particles and the organically modified layered silicate filler particles consist essentially of particles with an average particle size of not more than about 10 microns.

25. The process of claim 20, wherein the water-responsive polymer of ethylene oxide is a graft copolymer of homopolymer of ethylene oxide and at least one polar, vinyl monomer.

26. The process of claim 25, wherein the water-responsive polymer of ethylene oxide is formed by the graft polymerization of from about 0.1 to about 20 weight percent of polar, vinyl monomer or a mixture of polar, vinyl monomers relative to the total weight of a homopolymer of ethylene oxide and a polar, vinyl monomer or mixture of polar, vinyl monomers with the homopolymer of ethylene oxide.

27. The process of claim 24, wherein the polar, vinyl monomer is selected from the group consisting of 2-hydroxyethyl methacrylate, poly(ethylene glycol) methacrylates and poly(ethylene glycol)ethyl ether methacrylates.

28. A process of making a composition comprising
   a) creating a dry mixture of a poly(ethylene oxide) powder or pellets and greater than about 10 weight percent of organically modified clay particles or organically modified layered silicate particles, wherein the average particle size of the organically modified clay particles or organically modified layered silicate particles is not greater than about 10 microns; and b) melt extruding the dry mixture.

29. The process of claim 28, wherein the poly(ethylene oxide) has an average molecular weight greater than about 1,000,000 grams per mole and the organically modified clay particles comprise organically modified sodium montmorillonite.

30. A process of improving the stability of a water-responsive composition, the process comprising:

feeding a water-responsive polymer of ethylene oxide, an organically modified clay, a polar vinyl monomer and an initiator in to a twin-screw extruder; and melting and mixing the water-responsive polymer of ethylene oxide, the organically modified clay, the polar vinyl monomer and the initiator to produce a melt blend of a polar graft copolymer of ethylene oxide and the organically modified clay.

* * * * *